R. R. HERRMANN.
METHOD FOR TESTING TRANSMITTERS.
APPLICATION FILED NOV. 2, 1920.
1,412,405.
Patented Apr. 11, 1922.
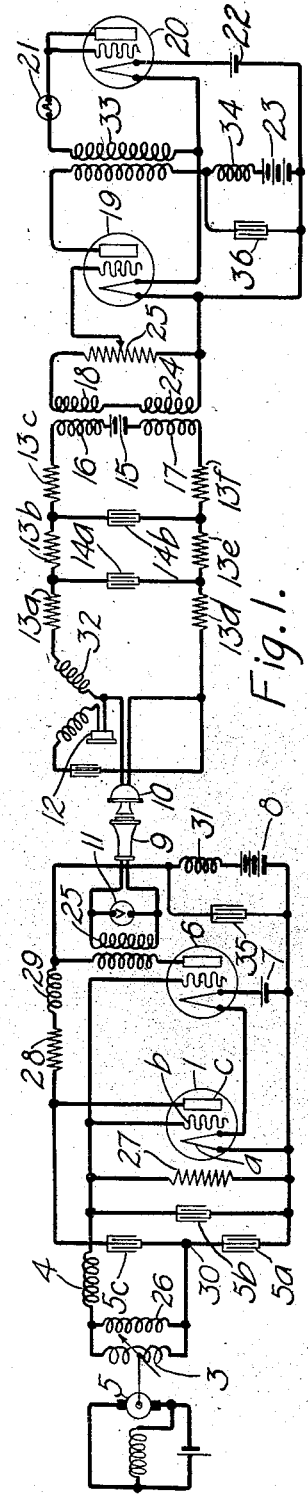
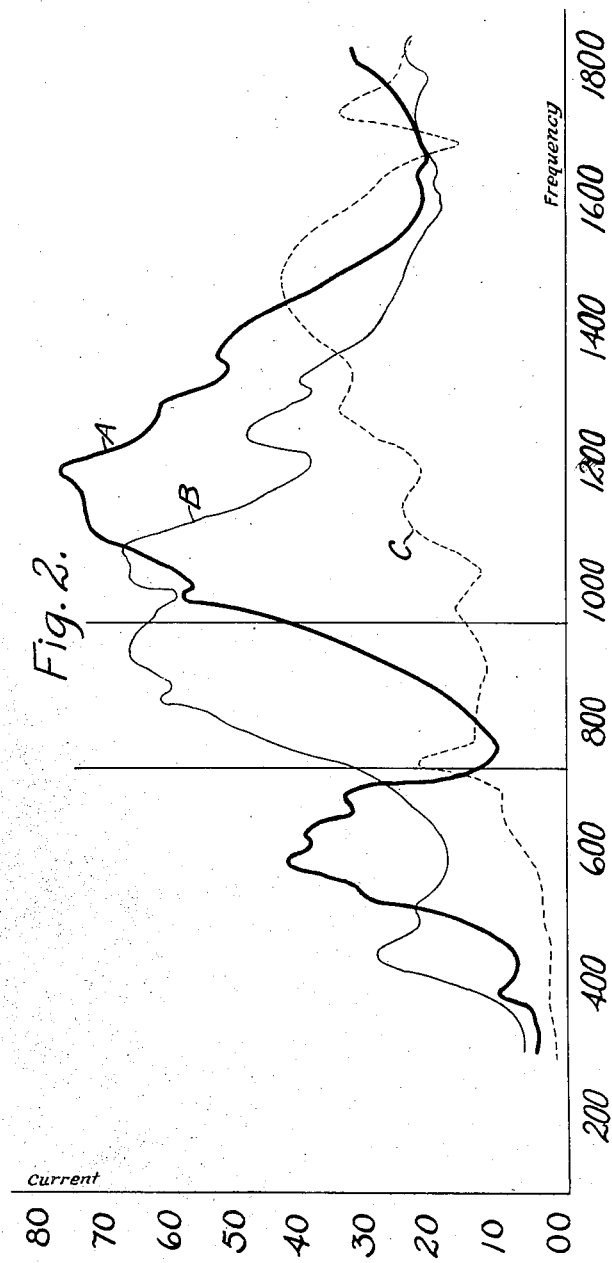
Inventor:
Raymond R. Herrmann.
by Joel Ch. Palmer, Atty.

UNITED STATES PATENT OFFICE.

RAYMOND R. HERRMANN, OF ST. PAUL, MINNESOTA, ASSIGNOR TO WESTERN ELECTRIC COMPANY, INCORPORATED, OF NEW YORK, N. Y., A CORPORATION OF NEW YORK.

METHOD FOR TESTING TRANSMITTERS.

1,412,405.   Specification of Letters Patent.   Patented Apr. 11, 1922.

Application filed November 2, 1920. Serial No. 421,257.

*To all whom it may concern:*

Be it known that I, RAYMOND R. HERRMANN, a citizen of the United States, residing at St. Paul, in the county of Ramsey, State of Minnesota, have invented certain new and useful Improvements in Methods for Testing Transmitters, of which the following is a full, clear, concise, and exact description.

This invention relates to methods of testing the quality efficiency of telephone transmitters, that is, the ability to reproduce the range of frequencies produced by the voice.

Prior to this invention, the test by which transmitters were selected was dependent upon the human voice and ear, both of which vary considerably. Consequently, there has been great difficulty in adhering to a standard.

The object of this invention is to introduce a mechanical method whereby the variation due to the human element in former methods is eliminated as much as possible.

The invention includes a source of sound which may be, for example, a standard telephone receiver which acoustically operates the apparatus under test, the transmitter. A source of energy in the form of an oscillation generator of the audion type is inductively connected to the receiver, and the currents between predetermined frequencies produced thereby in the apparatus under test are measured. An abnormal current flow will be observed in the circuit attached to the transmitter when the transmitter is of unacceptable quality.

In order to arrive at a decision as to what band of frequencies to select, an extended test is made on three types of transmitters, sharp, hollow and those of acceptable quality. Transmitters which emphasize the frequencies which produce the high notes are known as sharp. Those which emphasize the frequencies which produce the lower notes are known as hollow, while those which reproduce the frequencies produced by the voice are of acceptable quality. Curves are plotted with the average values of currents obtained during the tests as ordinates and the frequencies as abscissae. The current values are taken over a range of frequencies varying from about 300 to 1800. Curves A, B and C, Fig. 2 represent the average values of currents for acceptable quality, hollow and sharp transmitters, respectively.

Any band of frequencies that will give a sufficient variation in current values for the different grades of transmitters may be selected. Let us select the band between 750 and 950. It is seen that for a sharp transmitter, low current values are registered, while for a hollow one, high current values are obtained. Then a transmitter of acceptable quality gives values between these two extremes which are known as normal values. Consequently, the testing of a transmitter for quality consists in introducing the apparatus into the circuit and watching the indication given by the meter.

The inductance of the circuit is varied by means of a motor driven inductometer of the type set forth in the R. R. Herrmann application, Serial No. 294,217, filed May 2, 1919. The frequency can be cyclically varied by the above means over any band of frequencies desired.

For further details of the invention reference may be made to the drawings. Fig. 1 shows diagrammatically a testing system that may be used. Fig. 2 is a system of curves plotted from average values of current output as ordinates and frequency abscissae. In Fig. 1 the oscillation generator 1 supplies current, the frequency of which depends upon the inductance 3, 26 and 4 and the capacity $5^a$. The variation of the inductance 3 is continuous. For the purpose of this invention inductance 3 only is varied and this variation is such that the oscillation generator supplies current which varies cyclically over any predetermined band of frequencies.

The oscillation circuit consists of coils 3 and 26 connected in parallel, and then in series with coil 4 and capacity $5^a$. Across the terminals of this circuit, capacity $5^b$ and resistance 27 are connected in shunt. The terminals are then connected to the cathode (*a*) and grid (*b*) of the oscillation generator 1. One terminal of the coils 3 and 26 is connected through capacity $5^c$ to the plate circuit. The plate circuit consists of plate *c* resistance 28, inductance coils 29 and 31, supply battery 8 and cathode *a* of the oscillation generator. Inductance coil 31 and battery 8 have a condenser in parallel with them. An audion amplifier 6, which has a battery 7 for heating purposes connected to its cathode, is connected into the output circuit of the oscillation generator. The primary coil of transformer 25 is connected into the output circuit of the amplifier. The secondary of the transformer 25 is connected to the telephone receiver 9. A voltmeter 11 is connected across the secondary of the transformer to register the voltage supplied by the receiver. This voltage is kept constant.

In circuit with transmitter 10 is provided inductance coil 32 suitable resistances 13 (a, b, c, d, e, f) which with shunt condensers 14 (a, b) constitute a suitable load to simulate the impedance of any desired length of cable. A standard telephone set is also connected across the transmitter in parallel with the circuit above described. Direct current for transmitter 10 is supplied by battery 15 through coils 16 and 17, which are inductively related to coils 18 and 24. A potentiometer which is connected across coils 18 and 24, has its movable contact connected to the grid of the audion amplifier 19. The other terminal of the potentiometer is connected to the cathode of the amplifier. The plate circuit of the amplifier includes the primary of transformer 33, inductance coil 34, supply battery 23 and the cathode of the amplifier in series, and condenser 36 bridging the inductance coil and battery. The vacuum tube 20 is connected across the secondary of the transformer 33 and acts as a valve allowing only one half of each wave through so that the flow of current being always in the same direction a D. C. measuring instrument may be used to determine the current in the circuit.

From the above description it will be apparent that the audion generator 1 supplies to the receiver 9, currents which may be cyclically varied in frequency between 750 and 950 cycles per second. The currents delivered by the transmitter 10 to its load 13 (a, b, c, d, e, f) and 14 (a and b) may be observed by measuring instrument 21. When a hollow transmitter is being tested, 21 registers high current values as shown by curve B, Fig. 2; a sharp transmitter gives low current value as shown by curve C, while a transmitter of acceptable quality or that which corresponds with the standard gives intermediate values. Consequently, it is seen that the instrument 21 may be calibrated so as to indicate which of the three classes is being tested.

What is claimed is:

1. A method of determining the quality efficiency of a telephone transmitter which consists in agitating said transmitter by vibrations periodically varying through a given band of frequencies said band being so chosen as to cause in a circuit attached to the said transmitter an abnormal current flow when said transmitter is of unacceptable quality and noting current flow in said circuit.

2. The method of testing telephone apparatus which consists in energizing said apparatus in response to currents which uniformly vary through a predetermined band of frequencies within the acoustic range and determining the quality of said apparatus by the current values.

3. A system comprising means for supplying continuously and uniformly varying frequencies between predetermined values, a receiver responsive to said means, a transmitter responsive to said receiver and a measuring device associated with said transmitter to determine its quality by current values.

In witness whereof, I hereunto subscribe my name this twenty-eighth day of October, A. D. 1920.

RAYMOND R. HERRMANN.